June 27, 1933.   R. C. PIERCE   1,915,756
CAR
Filed Feb. 11, 1932   6 Sheets-Sheet 1
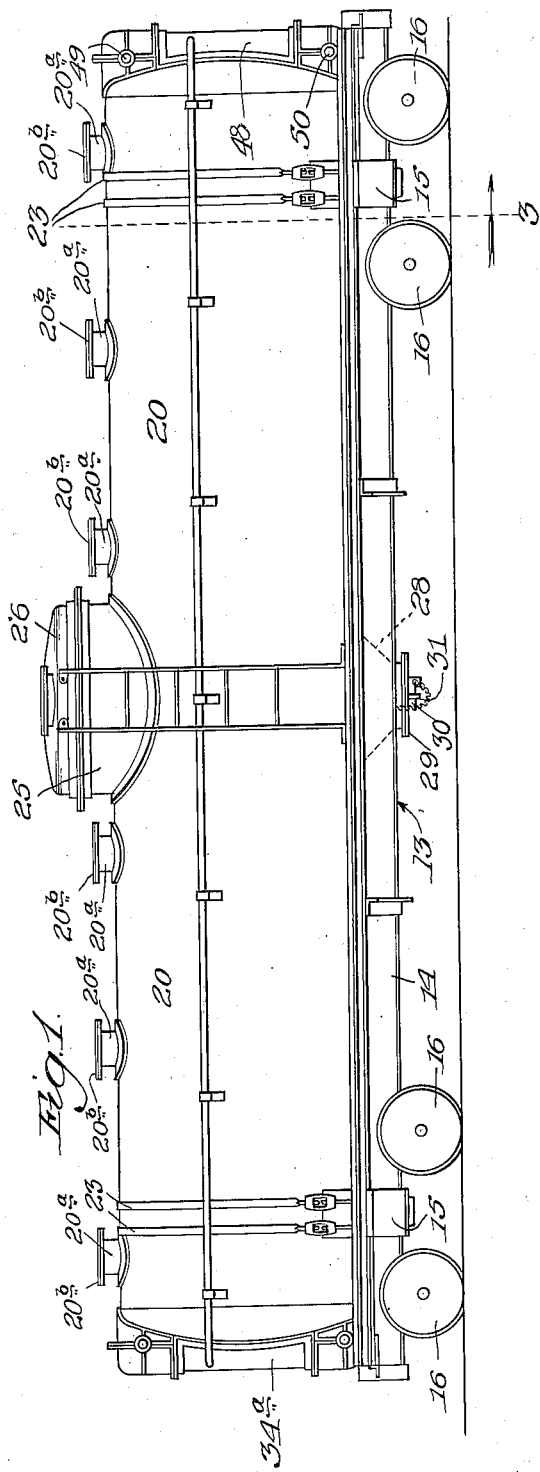
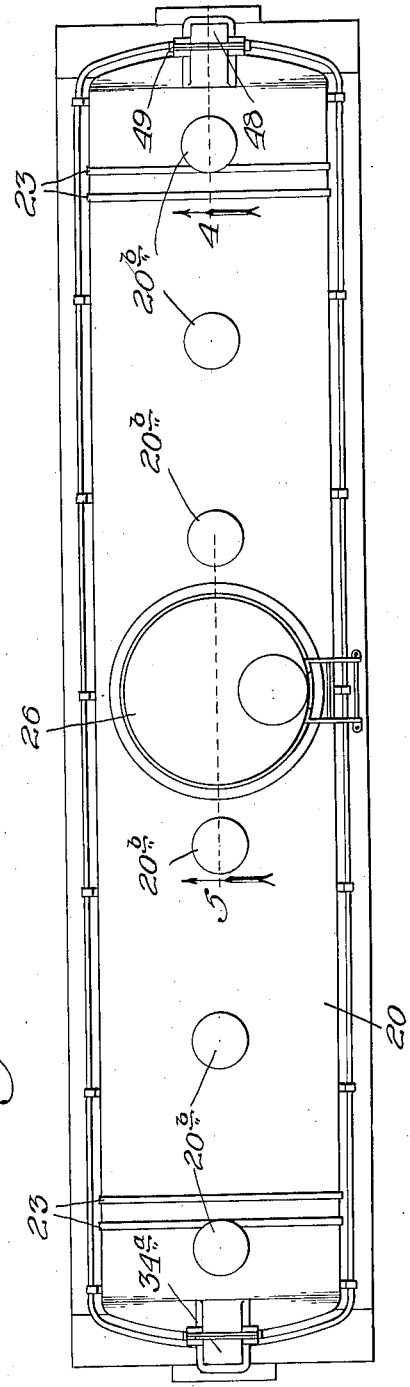
Inventor:
Raymond C. Pierce,
By Dyrenforth, Lee, Chritton & Wiles
Attys.

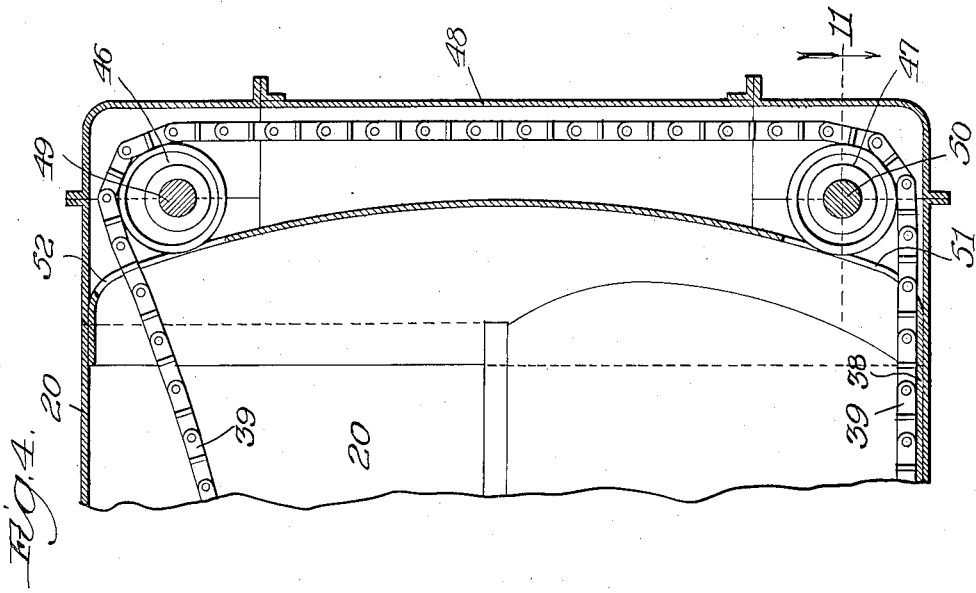
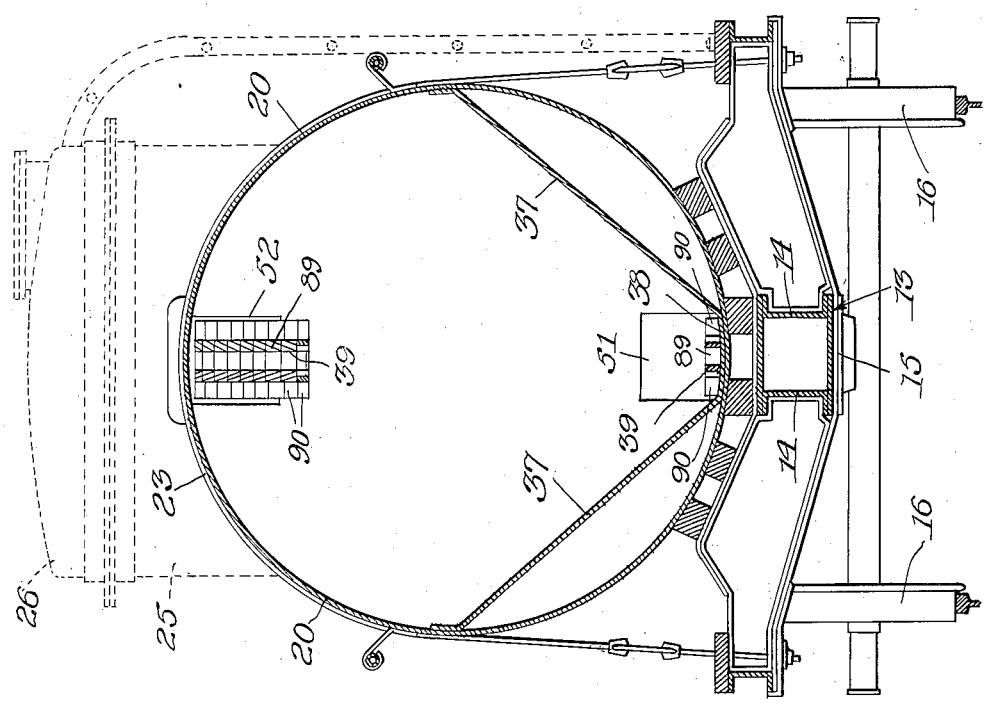

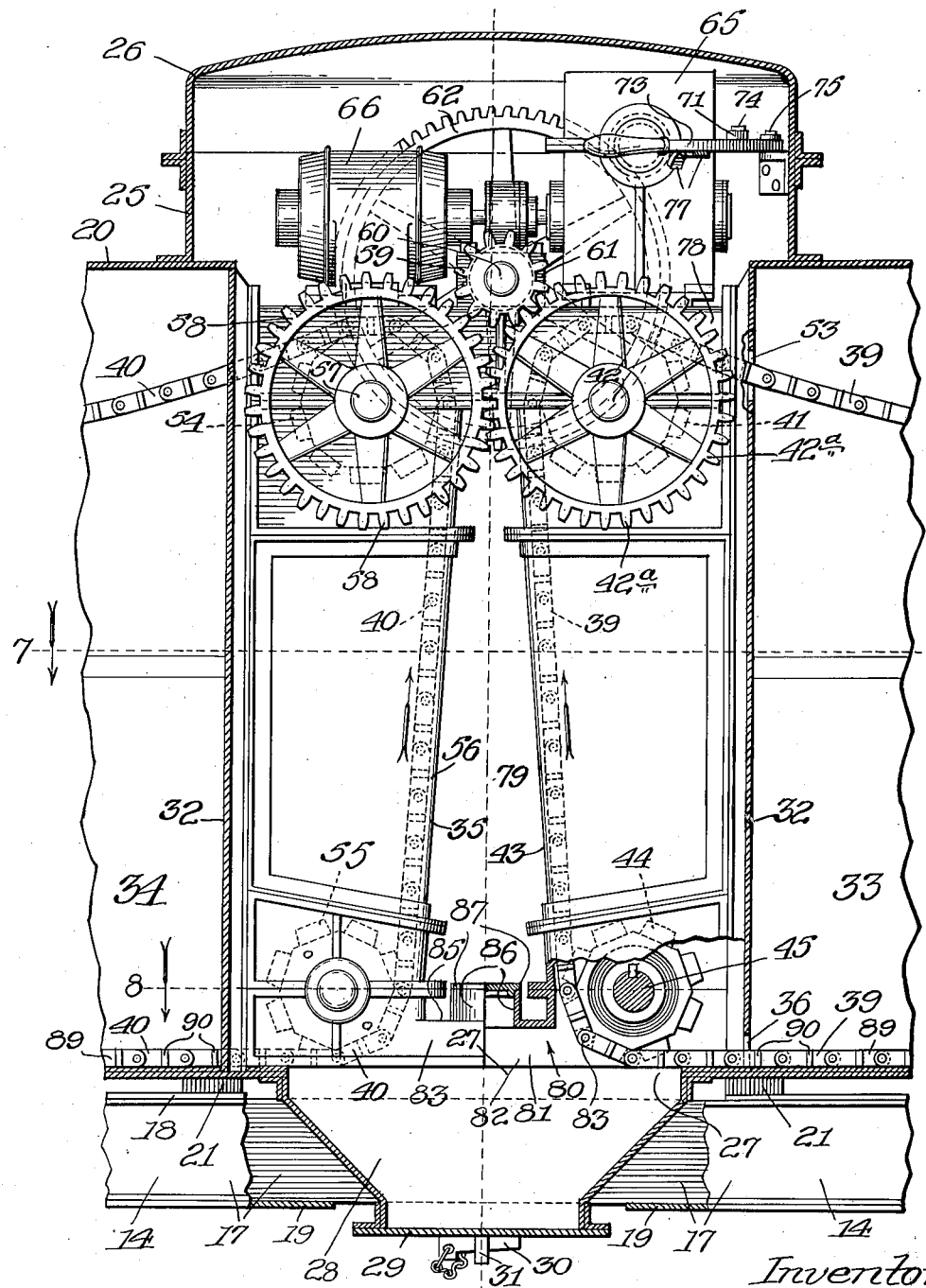

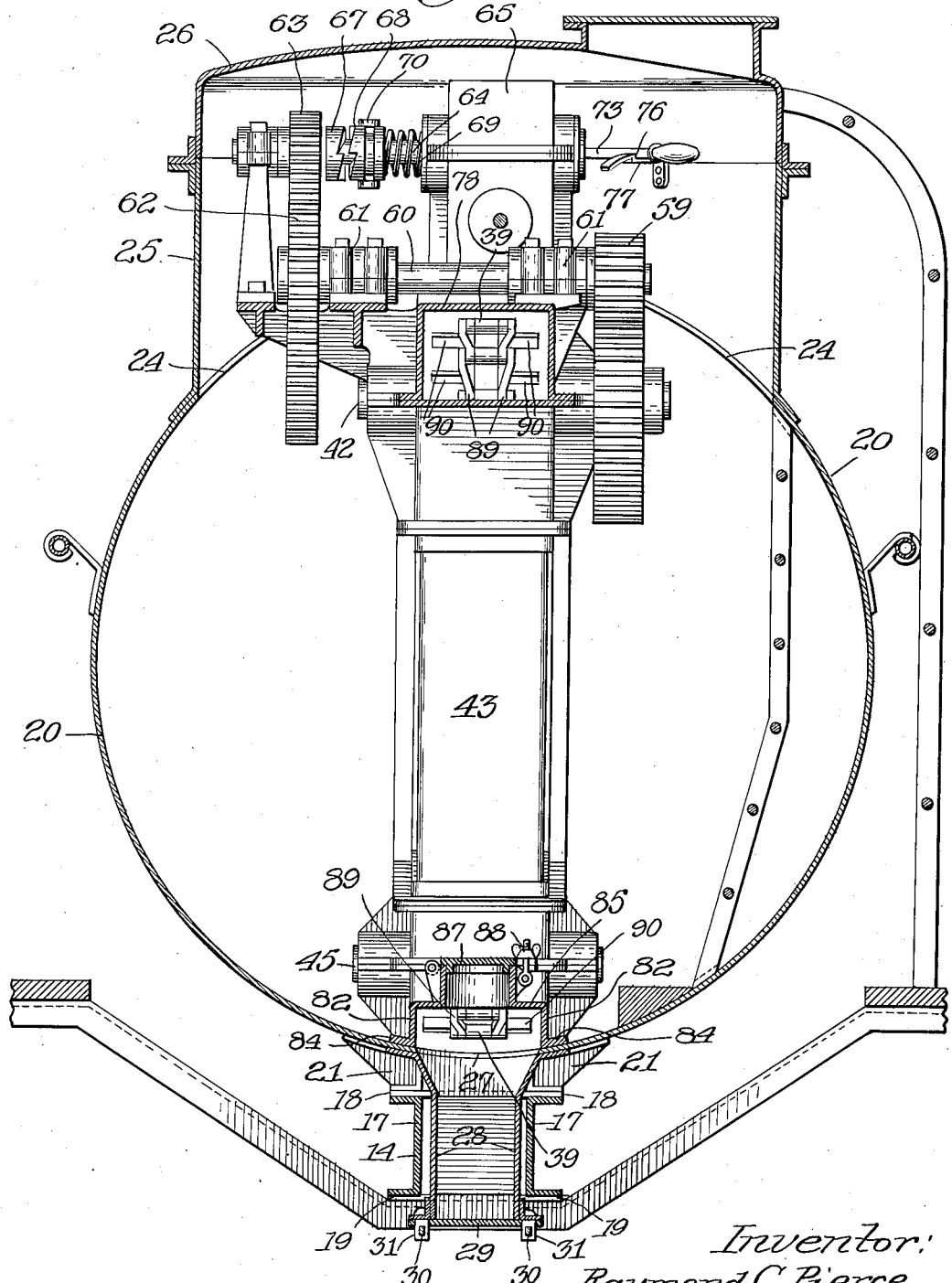

June 27, 1933. R. C. PIERCE 1,915,756

CAR

Filed Feb. 11, 1932 6 Sheets-Sheet 5

Inventor:
Raymond C. Pierce,
By Dyrenforth, Lee, Chritton & Wiles,
Attys.

June 27, 1933.   R. C. PIERCE   1,915,756
CAR
Filed Feb. 11, 1932   6 Sheets-Sheet 6
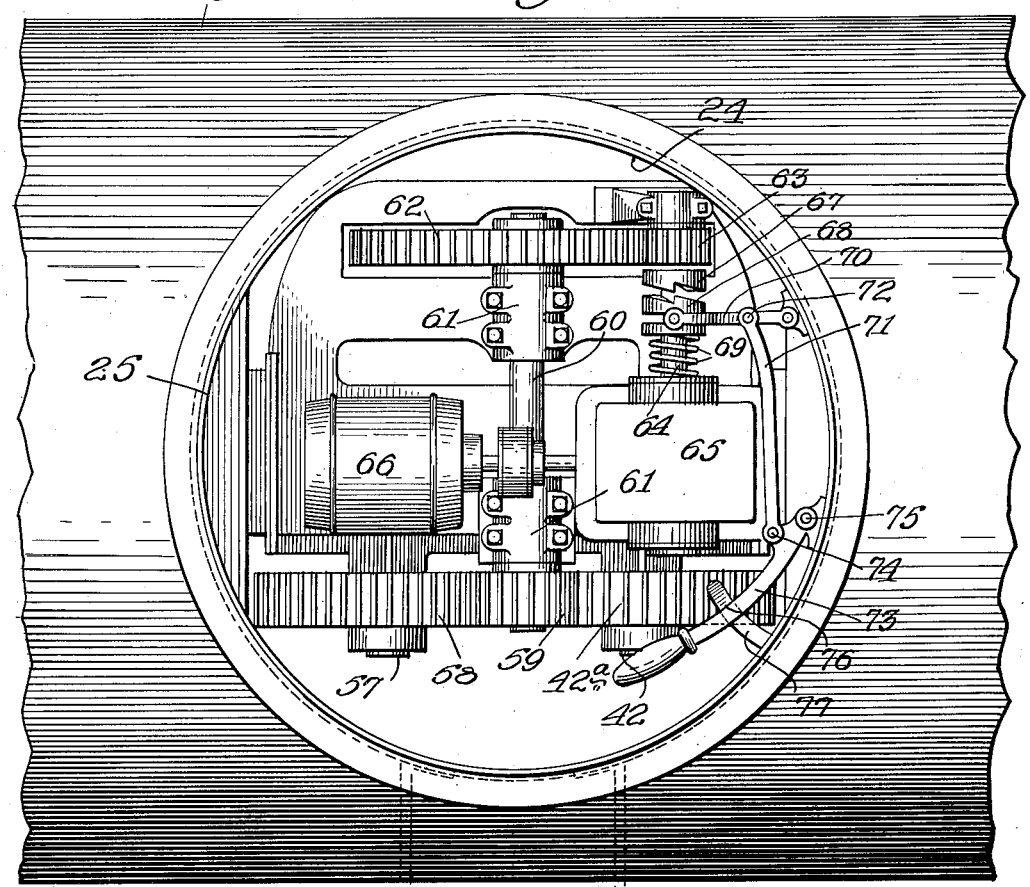
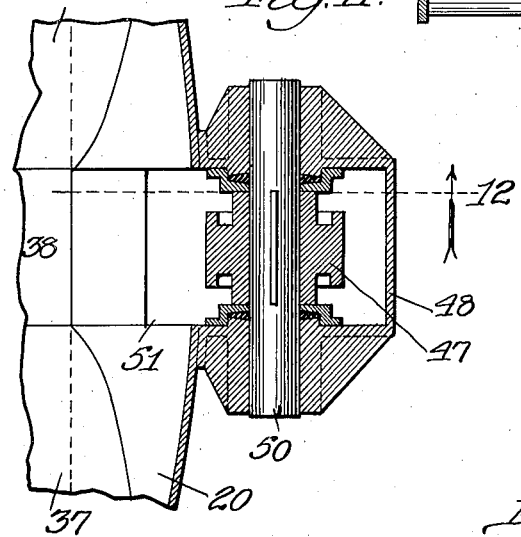
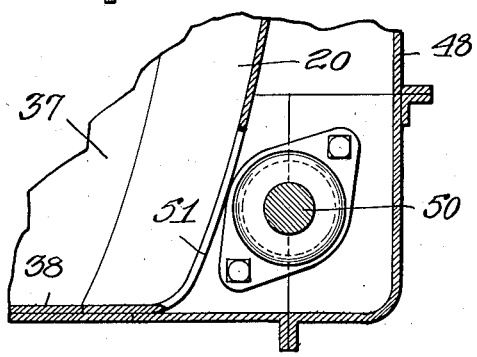
Inventor:
Raymond C. Pierce,
By Dyrenforth, Lee, Chritton & Wiles
Attys.

Patented June 27, 1933

1,915,756

UNITED STATES PATENT OFFICE

RAYMOND C. PIERCE, OF CHICAGO, ILLINOIS, ASSIGNOR TO GENERAL AMERICAN TANK CAR CORPORATION, OF CHICAGO, ILLINOIS, A CORPORATION OF WEST VIRGINIA

CAR

Application filed February 11, 1932. Serial No. 592,393.

My invention relates more particularly to cars for transporting in bulk relatively fine material such as for example pulverized coal, cement, soda ash, pulverized clay, flour, sulphur, grains, and seeds.

One of my objects is to provide for the more expeditious and economical transportation of ladings of the character above referred to.

Another object is to provide a novel, simple, and relatively inexpensive construction of car suitable for the transportation of such ladings.

Another object is to minimize the amount of labor required in the loading of such material into cars and the unloading thereof.

Another object is to provide a construction of car for such ladings in which the possibility of the ladings becoming unduly packed, under the jarring action, in transit, will be minimized; and other objects as will be manifest from the following description.

Referring to the accompanying drawings:

Figure 1 is a view in side elevation of a car embodying my invention.

Figure 2 is a plan view of the car.

Figure 3 is an enlarged sectional view taken at the line 3 on Fig. 1 and viewed in the direction of the arrow.

Figure 4 is an enlarged broken longitudinal sectional view taken at the line 4 on Fig. 2 and viewed in the direction of the arrow.

Figure 5 is an enlarged longitudinal sectional view taken at the line 5 on Fig. 2 and viewed in the direction of the arrow.

Figure 6 is a cross sectional view taken at the line 6 on Fig. 5 and viewed in the direction of the arrow.

Figure 10 is a broken plan view of the portion of the car shown in Fig. 5, the dome-cover being removed.

Figure 11 is a broken plan sectional view taken at the line 11 on Fig. 4 and viewed in the direction of the arrow; and Figure 12, a broken sectional view taken at the line 12 on Fig. 11 and viewed in the direction of the arrow.

Figure 7:
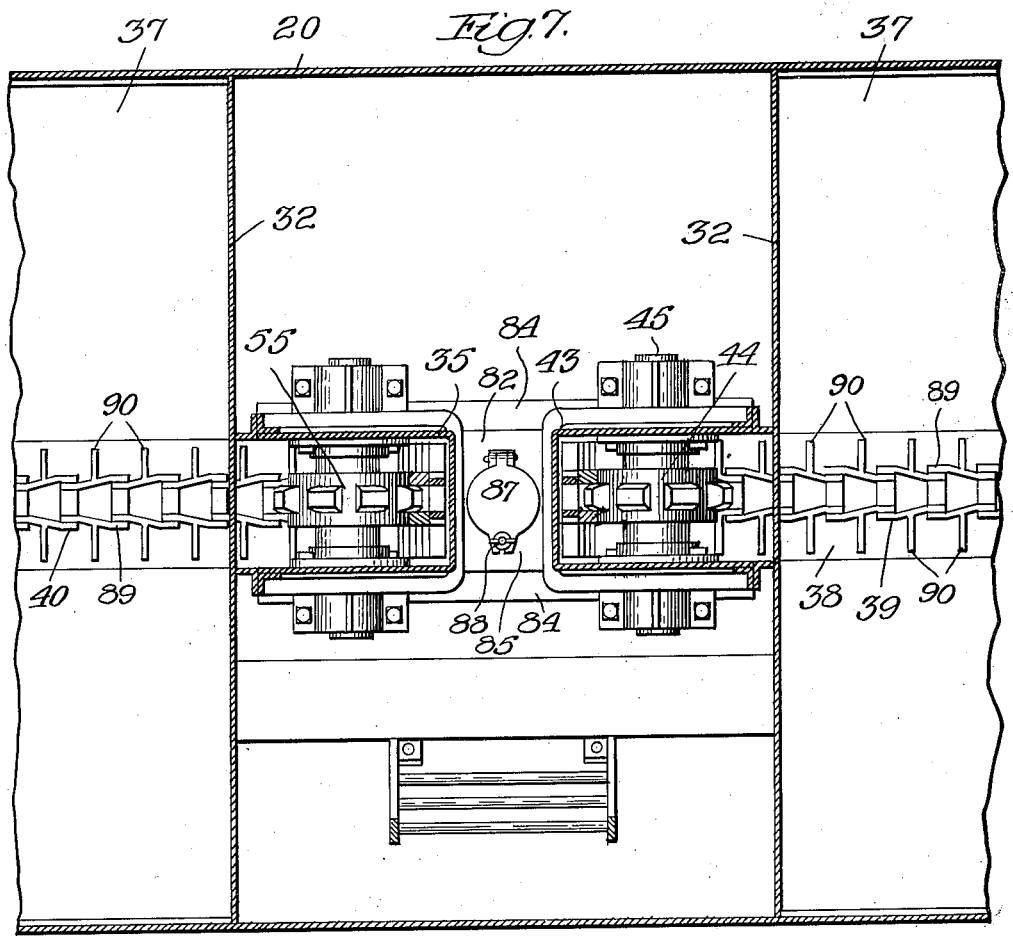
Figure 7 is a broken plan sectional view taken at the line 7 on Fig. 5 and viewed in the direction of the arrow.
Figure 8:
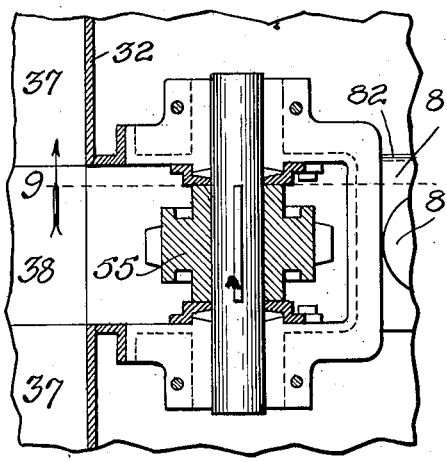
Figure 8 is a broken plan sectional view taken at the line 8 on Fig. 5 and viewed in the direction of the arrow.
Figure 9:
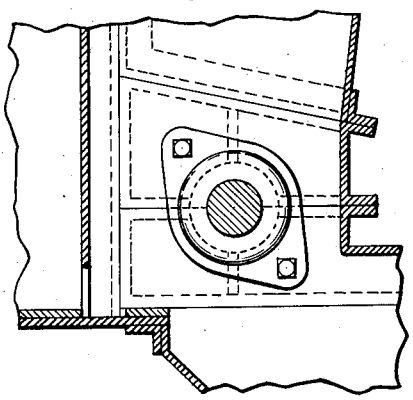
Figure 9 is a broken sectional view taken at the line 9 on Fig. 8 and viewed in the direction of the arrow.

Referring to the particular illustrated construction of car, 13 represents the underframe of the car which may be of any desirable construction, that shown being of the common center sill type comprising, generally stated, a center sill 14 suitably supported at its ends on bolsters 15 which, in turn, are supported on trucks in accordance with common practice the wheels of which are represented at 16, the center sill 14 being shown as formed of side-channels 17 spaced apart and upper and lower cover plates 18 and 19, respectively.

The car also comprises a cylindrical tank represented at 20 and extending lengthwise of the underframe, the tank being supported on its side at its ends on the bolsters 15 and between its ends on saddle members 21 mounted on, and secured to, the center sill 14, the tank 20 being constructed of sheet metal in accordance with the common practice of manufacturing tank cars as commonly provided.

The tank 20 may be held on the underframe 13 against shifting thereon, in any desirable manner, as for example by anchoring it to the saddles 21, the ends of the tank being free to slide on the bolsters 15, and employing tank bands 23 extending over the tank and anchored at their ends to the underframe.

The top of the tank 20, midway between its ends, is provided with a manhole 24 covered by a dome 25 having a removable cover portion 26 and in communication with the central compartment of the car hereinafter described. The top of the tank at opposite sides of the dome contains a series of openings extending therealong, preferably three in number and through which the material to be transported in the cars is introduced into the end storage compartments hereinafter described, these openings being in communication with domes $20^a$ having covers $20^b$.

The bottom of the tank 20 at its central portion, contains an outlet 27 from which depends a spout 28 located between the side channels 17 of the center sill 14, the upper end of the spout being of hopper shape and its lower end having a removable closure 29 in the form of a plate releasably held in closed position by any suitable means such as by the pins 30 extending beneath the plate 29 and supported in openings in depending lugs 31 on the spout.

At the opposite sides of the opening 24 are substantially vertical cross plates 32 which extend the full width and height of the tank 20 and form partitions which divide the tank into end compartments 33 and 34 for the lading and an intermediate compartment 35 located in vertical alinement with the opening 24 and in which a portion of the material-conveying mechanism hereinafter described is housed, the lower edges of the plates 32 containing openings 36 forming outlets for the compartments 33 and 34 through which the lading is discharged from these compartments toward the outlet 27 in the unloading of the car as hereinafter described.

The bottoms of the compartments 33 and 34 are of hopper shape in a direction transversely of the car and are formed of slope sheets 37 extending lengthwise of the compartments 33 and 34 at opposite sides of the median line of the car and throughout the length of these compartments, with a bottom sheet portion 38 joining the lower ends of the sheets 37.

In accordance with my invention I provide conveyor mechanisms one for each end compartment 33 and 34, each conveyor mechanism comprising an endless drag-chain which is positioned in the end compartment in which it operates and by the operation of which the lading in such compartment is fed therealong and through the outlet 36 to the outlet 27 of the tank for discharge through the spout 28.

These endless drag chains for the two end compartments are represented at 39 and 40. The chain 39 is trained around a sprocket 41 secured to a shaft 42 journaled at the upper end of a vertical housing 43 located in the compartment 35, the shaft 42 being equipped with a gear 42$^a$, a sprocket 44 in the lower portion of the housing 43 and secured to a shaft 45 journaled in the sides of this housing, and upper and lower idlers 46 and 47, respectively, which may be either in the form of pulleys or sprockets, but are shown in the drawings as pulleys, these idlers being located in a narrow vertical housing 48 secured to this end of the tank 20, the idlers 46 and 47 being located in the housing 48 and carried by shafts 49 and 50, respectively, journaled in the sides of this housing.

The chain 39 thus supported, extends, at the inner vertical reach thereof, from the sprocket 41 down through the housing 43 to the sprocket 44; the lower reach extends from the sprocket 44 through the opening 36 and along the trough-shaped portion of the compartment 33 to, and through, an opening 51 in the outer end wall of this compartment, to the idler 47; the outer vertical reach of the chain extends from the idler 47 upwardly through the housing 48 to the idler 46; and the upper reach of the chain extends from the idler 46 through an opening 52 in the upper portion of the outer end wall of the compartment 33 and thence through the upper portion of this compartment and out through an opening 53 in the upper portion of the inner end wall 32 of compartment 33, to the sprocket 41.

The chain 40 is associated with the compartment 34 and housings and trained about sprockets and idlers, all as explained above in connection with the chain 39, the sprockets which cooperate with the chain 40 and corresponding with the sprockets 41 and 44 being represented at 54 and 55, respectively, the housing for the outer reach of the chain at 34$^a$, and the housing for the inner vertical reach of the chain 40, at 56, the sprocket 54 being connected with a shaft 57 equipped with a gear 58 located in the compartment 35 and meshing with the sprocket 42$^a$.

The mechanism for driving the chains 39 and 40 in a direction for conveying the lading in the compartments 33 and 34, at a uniform rate, to the central discharge outlet 27 of the car, comprises a pinion 59 meshing with the gear 42$^a$ and fixed on a shaft 60 journaled in bearings 61 secured to the upper ends of the housings 43 and 56, the shaft 60 being provided with a gear 62 meshing with a pinion 63 rotatably mounted on the shaft 64 of gear reduction mechanism 65 shown as driven by a motor 66 mounted in the compartment 35.

The pinion 63 is driven by the shaft 64, preferably by any suitable mechanism insuring the drive of this pinion in one direction only (namely, in a direction for moving the chains 39 and 40 at their lower reaches toward the center of the car), and controllable by the operator to connect and disconnect, at will, the pinion 63 and shaft 64.

The particular illustrated construction of means for this purpose comprises a rigid gear 67 forming one section of a one-way clutch, the other section of which, and represented at 68, is splined to the shaft 64 to be driven thereby. A spring 69, encircling the shaft 64 and interposed between the ratchet section 68 and the casing of the gear reduction mechanism 65, urges the clutch 68 into clutched engagement with the clutch section 67, the mutual engagement of these clutch sections being controlled by a clutch-shifting lever 70, such as is commonly used in clutch constructions and engaging the clutch section 68. The lever 70 is controlled by a link 71 pivoted to the lever 70 at 72 and to a hand lever 73 at 74, the lever 73 being pivotally supported at 75 on a stationary part of the car and engageable with a stop shoulder 76 on a spring bar 77 supported on the dome 25 for holding the clutch sections 67 and 68 out of clutched position.

The arrangement of mechanism described, operating to cause the conveyor chains 39 and 40 to operate only in the direction of the arrows in Fig. 5 and thus convey the lading from the end compartments 33 and 34 to the center of the car, insures against objectionable reverse operation of these chains.

The housing 43 and 56 are shown as closed at their upper ends by a cap-section 78 extending thereacross in a plane below the mechanism for driving the gearing 42ª and 58, and closing the space between these housings and represented at 79.

At the lower ends of the housings 43 and 56 is a member 80 which is provided with a central channel portion 81 disposed between the lower ends of the housings 43 and 56 and closing these housings to the space 79. The side walls of the channel portion 81, and represented at 82 and which straddle the outlet 27, are extended lengthwise of the car to afford the portions 83 which form downward continuations of the side walls of the housings 43 and 56, reaching to the bottom of the tank 20, the side walls 82 and their extensions 83 being shown as flanged at 84 at which flanges they are secured to the bottom of the tank 20. The base 85 of the inverted channel portion 81 is provided with a central wall portion 86 closed by a cap plate 87 hinged to the wall portion 86 and secured in place by a fastening represented at 88.

The construction above described is such, as will be readily understood, that the housings 43 and 56 are open only to the compartments 33 and 34, respectively, and to the outlet 27, and thus the space in which the mechanism for driving the conveyor chains 39 and 40, is located, is shielded against the entry thereto of dust which, in the operation of the chains in conveying the lading to the outlet 27 and in the discharge of the lading through this outlet, would otherwise enter the space just referred to and become deposited on the chain operating mechanism and the bearings therof.

In the use of the car the lading would be charged into the compartments 33 and 34 through the filler openings in the tops of these compartments. In the case of the charging of the compartments with lading which is readily flowable, the central one only of each of the set of openings would be used, whereas in the case of material which flows sluggishly the filling would take place through all of the openings of each set thereof.

To discharge the lading from the compartments the operator throws the clutch to clutching position whereupon the conveyor chains 39 and 40 operate to convey the lading from the compartments 33 and 34 out through the openings 36 to the central outlet 27 of the car through which the lading discharges from the car, the closure 29 having been removed.

It will be understood from the foregoing that the chains in their operation produce uniform feed of the lading to the outlet 27 and by reason of the association of these chains with the trough-shaped bottoms of the compartments, all of the material may be discharged from these compartments by the action of the chains.

In this connection it may be stated that the chains 39 and 40 may be of any suitable construction for thus feeding the lading through the openings 36 to the outlet 27 of the car, the form shown and which is well known in practice being of the type in which the links 89 thereof are provided with plates 90 extending laterally therefrom in opposite directions.

As illustrated in the drawings, and preferably, the idlers 46 are mounted for rotation about axes eccentric to their peripheries whereby in the movement of the chains 39 and 40 responsive to the drive mechanism above described, the upper reaches of these chains and which are in slack condition, as shown, are caused to be subjected to an intermittent jerking action thereby causing these portions of the chains to whip against the lading in the upper portions of the compartments 33 and 34 and maintain the lading in relatively loose condition against its tendency to become compacted under the jarring action to which it is subjected in the movement of the car in transit.

The use of drag-chains as the means for feeding the ladings for discharge presents many advantages over conveyors of the screw type, certain of which are that the drag chains are much more rugged than screw conveyors, and are less easily damaged in engaging with large lumps of material of foreign bodies with which they may become contacted.

Furthermore, in a drag-chain type of conveyor it is not necessary to employ, in addition to the slope sheets for directing the lading laterally inwardly toward the conveyor, other sheets above the conveyor and required in conveyors of the screw type, thereby effecting a gain in lading capacity, and furthermore militating against the likelihood of bridging of the material, as for example cement, over the conveyor means and preventing the unloading of the car, these other sheets by reason of the creation of relatively flat angles between the slope sheets, being more conducive to such bridging action.

Provision of the housings at the outer ends of the tank in which the end sprockets and idlers are housed is desirable as loss in lading-capacity is minimized, the inside of the tank is kept clean and the presentation of angles, which would tend to hold up the lading such as cement and similar materials, is avoided.

The location of the drive machinery for the conveyors in the top portion of the central compartment 35 is desirable especially as it is thereby rendered easily accessible as for example for repairs or adjustments.

While I have illustrated and described a particular embodiment of my invention, I do not wish to be understood as intending to limit it thereto as the same may be variously modified and altered and the invention embodied in other forms of structure without departing from the spirit thereof. Thus, as one example, of changes which may be made, the prime-mover, viz., the motor, may be omitted where it is desirable that power for operating the drag chain 39 and 40 be applied from a power device located otherwise than on the car, in which case any suitable means would be provided for releasably coupling such prime mover to the gearing which drives the chains.

What I claim as new, and desire to secure by Letters Patent, is:

1. A car having a container portion provided with an opening between its ends through which the lading is removed from the car, conveyor-chain mechanism comprising chains for moving the lading lengthwise of the car from opposite ends thereof toward said opening, and housings at the ends, and exterior, of said container portion for the outer end reaches of the chains.

2. A car having end compartments for the lading and an opening between said compartments through which the lading is removed from said compartments and conveyor chain mechanism comprising endless-chain elements in said compartments and members over which said chains are trained, certain of said members being drive members for said chains, said members being so arranged as to position portions of the chain along the bottoms of the compartments and other portions thereof upwardly beyond the outer ends of the compartments.

3. A car having end compartments for the lading and an opening between said compartments through which the lading is removed from said compartments, conveyor-chain mechanism comprising conveyor-chain elements in said compartments, respectively, and operating, when actuated, to move the lading from said compartments toward said opening for removal therethrough, said conveyor-chains extending through the outer end walls of said compartments, and housings beyond said end walls and into which said chains extend.

4. A car having end compartments for the lading and an opening between said compartments through which the lading is removed from said compartments and conveyor chain mechanism comprising endless-chain elements in said compartments and members over which said chains are trained, certain of said members being drive members for said chains, said members being so arranged as to position portions of the chain along the bottoms of the compartments and other portions thereof upwardly beyond the outer ends of the compartments and housings beyond said end-walls and in which said upwardly extending portions of said chains and the adjacent upper and lower ones of said chain positioning members are located.

5. A car having end compartments for the lading and an intermediate compartment, the car having an opening between said end compartments in communication with said end compartments and through which the lading is removed from said end compartments, and conveyor chain mechanism comprising endless chains in said end compartments for conveying the lading from said end compartments toward said opening and members over which said chains are trained, certain of said members being located in said intermediate compartment.

6. A car having end compartments for the lading and an intermediate compartment, the car having an opening between said end compartments in communication with said end compartments and through which the lading is removed from said end compartments and conveyor chain mechanism comprising endless chains in said end compartments for conveying the lading from said end compartments toward said opening, members over which said chains are trained, certain of said members being located in said intermediate compartment and means by which said chains are operated located in said intermediate compartment.

7. A car having end compartments for the lading and an intermediate compartment, the car having an opening between said end compartments in communication with said end compartments and through which the lading is removed from said end compartments, conveyor chains in said end compartments for conveying the lading therefrom toward said opening and means located in said intermediate compartment for driving said chains.

8. A car having end compartments for the lading and an intermediate compartment, the car having an opening between said end compartments in communication with said end compartments and through which the lading is removed from said end compartments, conveyor chains in said end compartments for conveying the lading therefrom toward said opening, means located in said intermediate compartment for driving said chains, and housings in said intermediate compartment shielding said means against dust rising from the lading.

9. A car having end compartments for the lading and an intermediate compartment, the car having an opening between said end compartments in communication with said end compartments and through which the lading is removed from said end compartments, conveyor chain mechanism comprising endless chains in said end compartments for conveying the lading from said end compartments toward said opening and members over which said chains are trained, certain of said members being located in said intermediate compartment and means located in the upper portion of said intermediate compartment and by which said chains are operated.

10. A car having end compartments for the lading and an intermediate compartment, the car having an opening between said end compartments in communication with said end compartments and through which the lading is removed from said end compartments, conveyor chain mechanism comprising endless chains in said end compartments for conveying the lading from said end compartments toward said opening and members over which said chains are trained, certain of said members being located in said intermediate compartment and means located in the upper portion of said intermediate compartment and by which said chains are operated and means in said intermediate compartment shielding said first-named means against dust rising from the lading.

11. A car having end compartments for the lading and an intermediate compartment, the car having an opening between said end compartments in communication with said end compartments and through which the lading is removed from said end compartments, conveyor chain mechanism comprising endless chains in said end compartments for conveying the lading from said end compartments toward said opening and members over which said chains are trained, the car having a dome located above, and opening into, said intermediate compartment, and means for driving said chains extending above said chains and located in said intermediate compartment and dome.

12. A car having end compartments for the lading and an intermediate compartment, the car having an opening between said end compartments in communication with said compartments and through which the lading is removed from said end compartments, conveyor-chain mechanism comprising endless chains for conveying the lading from said end compartments toward said opening and members over which said chains are trained, certain of said members being drive members for said chains, certain of said members being located in said intermediate compartment and others beyond the outer ends of said end compartments, said members being so arranged as to position said chains to afford upper and lower reaches in said end compartments and upwardly extending reaches, respectively, in said intermediate compartment and beyond the outer ends of said end compartments, housings beyond the outer ends of said end compartments for the outer upwardly extending reaches of said chains and in which the adjacent ones of said members extend, housings in said intermediate compartment for the inner upwardly extending reaches of the chains, means at the upper portion of said intermediate compartment by which said chains are driven, and means for preventing contact with said means of the dust rising from the lading.

13. A receptacle for lading and having an outlet, an endless conveyor chain extending in said receptacle, and means supporting said chain with the upper reach thereof slack and in contact with the lading, and means for increasing and reducing alternately the slack in said upper portion of the chain.

14. A receptacle for lading and having an outlet, an endless conveyor chain extending in said receptacle and having a portion contacting with the lading, and means for causing the chain to produce a whipping action against the lading, members over which the chain is trained certain of said members being driven to drive the chain with the upper reaches of the chain slack and in contact with the lading, and certain of the others of said members being mounted to rotate about an eccentric axis to cause the upper reach of the chain to whip against the lading.

15. A car having a container portion provided with an opening between its ends through which the lading is removed from the car, conveyor-chain mechanism comprising a plurality of conveyor chains for moving the lading lengthwise of the car from opposite ends thereof toward said opening and housings at the ends of said container portion for the outer end reaches of the chains.

16. A car having a lading compartment and a second compartment communicating therewith and provided with a discharge outlet and conveyor chain mechanism for conveying the lading from said lading compartment to said second compartment comprising an endless chain extending along the bottom of said lading compartment and members over which said chain is trained, those of said members from the one to the other of which the lower reach of the chain extends being located exteriorly of said lading compartment, and one thereof located in said second compartment.

17. A car having a container portion and provided with a discharge opening through which the lading is removed from the car, conveyor chain mechanism for moving the lading lengthwise of said container portion toward said opening and a housing at the end of said container portion opposite that at which said opening is located for the adjacent outer end reach of the chain.

18. A car having a container portion and provided with a discharge opening through which the lading is removed from the car, conveyor-chain mechanism for moving the lading lengthwise of said container portion toward said opening and a housing at the end of said container portion and exteriorly of the latter for the adjacent outer end reach of the chain.

19. A car having a container portion and provided with a discharge opening through which the lading is removed from the car, conveyor chain mechanism comprising a conveyor chain in said container portion and operating when actuated to move the lading toward said opening for removal therethrough, said conveyor chain extending through the one of the walls of said container portion remote from said opening and a housing beyond said wall and into which said chain extends.

20. A car having a container portion and provided with a discharge opening through which the lading is removed from the car, and conveyor chain mechanism comprising an endless conveyor chain in said container portion and members over which said chain is trained, one of said members being a drive member for said chain, said members being so arranged as to position a portion of the chain along the bottom of said container portion and another portion thereof upwardly beyond the one of the walls of said container portion remote from said opening and a housing beyond said wall and in which said upwardly extending portion of said chain and the adjacent upper and lower ones of said chain-positioning members are located.

21. A car having a lading compartment and a second compartment communicating therewith and provided with a discharge outlet and conveyor chain mechanism for conveying the lading from said lading compartment to said second compartment comprising an endless chain and members over which said chain is trained certain of said members being located in said second compartment.

22. A car having a lading compartment and a second compartment communicating therewith and provided with a discharge outlet and conveyor chain mechanism for conveying the lading from said lading compartment to said second compartment comprising an endless chain, members over which said chain is trained, certain of said members being located in said second compartment and means by which said chain is operated located in said second compartment.

23. A car having a lading compartment and a second compartment communicating therewith and provided with a discharge outlet, and through which the lading is removed from said lading compartment, a conveyor chain in said lading compartment for conveying the lading toward said outlet and means located in said second compartment for driving said chain.

24. A car having a lading compartment and a second compartment communicating therewith and provided with a discharge outlet, and through which the lading is removed from said lading compartment, a conveyor chain in said lading compartment for conveying the lading toward said outlet, means located in said second compartment for driving said chain, and a housing in said second compartment shielding said means against dust rising from the lading.

25. A car having a lading compartment and a second compartment communicating therewith and provided with a discharge outlet and conveyor chain mechanism for conveying the lading from said lading compartment to said second compartment comprising an endless chain in said lading compartment and members over which said chain is trained, certain of said members being located in said second compartment, and means located in the upper portion of said second compartment and by which said chain is operated.

26. A car having a lading compartment and a second compartment communicating therewith and provided with a discharge outlet, conveyor chain mechanism for conveying the lading from said lading compartment to said second compartment comprising an endless chain in said lading compartment and members over which said chain is trained, certain of said members being located in said second compartment, and means located in the upper portion of said second compartment and by which said chain is operated, and means in said second compartment shielding said first-named means against dust rising from the lading.

27. A car having a lading compartment and a second compartment communicating therewith and provided with a discharge outlet, conveyor chain mechanism for conveying the lading from said lading compartment to said second compartment comprising an endless chain in said lading compartment and members over which said chain is trained, the car having a dome located above and opening into, said second compartment, and means for driving said chain extending above said chain and located in said second compartment and dome.

28. A car having a lading compartment and a second compartment communicating therewith and provided with a discharge outlet, conveyor chain mechanism comprising an endless chain in said lading compartment and members over which said chain is trained, one of said members being a drive member for said chain, certain of said members being located in said second compartment and others thereof beyond the one of the walls of said lading compartment remote from said opening, said members being so arranged as to position said chain to afford upper and lower reach portions in said lading compartment and upwardly extending reach portions, respectively, in said second compartment and beyond said wall, a housing beyond said wall for the outer upwardly extending reach portion of said chain and in which the adjacent ones of said member extend, a housing in said second compartment for the inner upwardly extending reach portion of the chain, means at the upper portion of said second compartment by which said chain is driven, and means for preventing contact with said means of the dust rising from the lading.

29. A car having a container portion and provided with a discharge opening through which the lading is removed from the car, and conveyor chain mechanism comprising an endless conveyor chain in said container portion and members over which said chain is trained, one of said members being a drive member for said chain, said members being so arranged as to position a portion of the chain along the bottom of said container portion and another portion thereof upwardly adjacent the end of said container portion remote from said opening and a housing in which said upwardly extending portion of said chain and the adjacent upper and lower ones of said chain-positioning members are located.

30. A car having a lading compartment and a second compartment, the car also having a discharge opening, and conveyor chain mechanism for conveying the lading from said lading compartment for discharge through said opening comprising an endless chain and members over which said chain is trained, certain of said members being located in said second compartment.

31. A car having a lading compartment and a second compartment, the car also having a discharge opening, conveyor chain mechanism for conveying the lading from said lading compartment for discharge through said opening comprising an endless chain and members over which said chain is trained, certain of said members being located in said second compartment, and means by which said chain is operated located in said second compartment.

32. A car having a lading compartment and a second compartment, the car also having a discharge outlet through which the lading in the lading compartment is removed, a conveyor chain in said lading compartment for conveying the lading toward said outlet, and means located in said second compartment for driving said chain.

33. A car having a lading compartment and a second compartment, the car also having a discharge outlet through which the lading in the lading compartment is removed, a conveyor chain in said lading compartment for conveying the lading toward said outlet, means located in said second compartment for driving said chain, and a housing in said second compartment shielding said means against dust rising from the lading.

34. A car having a lading compartment and a second compartment, the car also having a discharge outlet through which the lading in the lading compartment is removed, and conveyor chain mechanism for conveying the lading from said lading compartment toward said outlet comprising an endless chain in said lading compartment and members over which said chain is trained, certain of said members being located in said second compartment, and means located in the upper portion of said second compartment and by which said chain is operated.

35. A car having a lading compartment and a second compartment, the car also having a discharge outlet through which the lading in the lading compartment is removed, conveyor chain mechanism for conveying the lading from said lading compartment toward said outlet comprising an endless chain in said lading compartment and members over which said chain is trained, certain of said members being located in said second compartment, means located in the upper portion of said second compartment and by which said chain is operated, and means in said second compartment shielding said first-named means against dust rising from the lading.

36. A car having a lading compartment and a second compartment, the car also having a discharge outlet through which the lading in the lading compartment is removed, conveyor chain mechanism for conveying the lading from said lading compartment toward said outlet and comprising an endless chain in said lading compartment and members over which said chain is trained, the car having a dome located above, and opening into, said second compartment, and means for driving said chain extending above said chain and located in said second compartment and dome.

37. A car having a lading compartment and a second compartment, the car also having a discharge outlet through which the lading in the lading compartment is removed, conveyor chain mechanism comprising an endless chain in said lading compartment and members over which said chain is trained, one of said members being a drive member for said chain, certain of said members being located in said second compartment and others thereof beyond the one of the walls of said lading compartment remote from said opening, said members being so arranged as to position said chain to afford upper and lower reach portions in said lading compartment and upwardly extending reach portions, respectively, in said second compartment and beyond said wall, a housing beyond said wall for the outer upwardly extending reach portion of said chain and in which the adjacent ones of said members extend, a housing in said second compartment for the inner upwardly extending reach portion of the chain, means at the upper portion of said second compartment by which said chain is driven, and means for preventing contact with said means of the dust rising from the lading.

38. A car having a container portion and provided with a discharge opening through which the lading is removed from the car, conveyor chain mechanism for moving the lading lengthwise of said container portion toward said opening and a housing adjacent said opening for the adjacent end reach of the chain.

39. A car having a lading compartment and a second compartment, the car also having a discharge outlet through which the lading in the lading compartment is removed, and conveyor chain mechanism for conveying the lading from said lading compartment toward said outlet comprising an endless chain extending along the bottom of said lading compartment and members over which said chain is trained, those of said members from the one to the other of which the lower reach of the chain extends being located exteriorly of said lading compartment and one thereof located in said second compartment.

RAYMOND C. PIERCE.